United States Patent [19]

Thomas

[11] 3,773,572
[45] Nov. 20, 1973

[54] PENTAERYTHRITOL TETRANITRATE COATED WITH SILICONE
[75] Inventor: Hugh Thomas, Irvine, Scotland
[73] Assignee: Imperial Chemical Industries Limited, London, England
[22] Filed: Sept. 22, 1972
[21] Appl. No.: 291,317

[30] Foreign Application Priority Data
Oct. 4, 1971   Great Britain.................. 46,049/71

[52] U.S. Cl..................... 149/11, 102/27 R, 149/93, 260/467
[51] Int. Cl............................................ C06b 19/02
[58] Field of Search ................ 149/11, 93; 260/467; 102/27 R

[56] References Cited
UNITED STATES PATENTS
| | | | |
|---|---|---|---|
| 2,867,647 | 1/1959 | Cow et al............................ | 149/93 X |
| 3,190,775 | 6/1965 | Ender.................................. | 149/7 X |
| 3,190,776 | 6/1965 | Ender.................................. | 149/7 X |
| 3,318,739 | 5/1967 | Voigt, Jr............................... | 149/11 |

Primary Examiner—Leland A. Sebastian
Attorney—Cushman, Darby & Cushman

[57] ABSTRACT

Improved Pentaerythritol Tetranitrate is prepared by treating the PETN with silicone to reduce its water permeability. The improved PETN is especially useful for detonating cord.

10 Claims, No Drawings

PENTAERYTHRITOL TETRANITRATE COATED WITH SILICONE

This invention relates to pentaerythritol tetranitrate (PETN) modified to reduce its water permeability. The invention also includes a method of preparing the improved PETN and detonating cord containing the improved PETN.

PETN is a solid, granular detonating explosive material which is widely used as a base charge in commercial detonators and as the core material in detonating fuse-cord. In blasting operations, for example in quarrying and opencast mining, it is common practice to connect blasting charges in deep water-filled shotholes with detonation transmission lines of detonating cord which may be required to remain immersed in the water for several days before the charges are fired. If the PETN core becomes exposed to the water, sufficient water may permeate through the PETN granules to cause propagation failures.

It is an object of this invention to provide a modified PETN having reduced water permeability suitable for use in commercial detonators and detonating cord. A further object is to provide a detonating cord having enhanced reliability when immersed in water.

The improved PETN of the invention comprises PETN particles coated with silicone. Preferably the modified PETN comprises 0.1 to 0.5 percent by weight of silicone.

The silicone conveniently comprises a polysiloxane containing units having the structure $R_xSiO_{4-x/2}$, wherein R is hydrogen or a monovalent hydrocarbon group, not more than one hydrogen atom being attached to any Si atom, and $x$ is 1 or 2. Preferably the silicone comprises a linear polysiloxane having the formula $(CH_3)_3Si[OSiR_2]_n OSi(CH_3)_3$ wherein R is hydrogen or alkyl and n is an integer, or a cyclic polysiloxane having the formula $[SiR_2O]_n$ wherein R is hydrogen or alkyl and $n$ is an integer of 3 to 8.

Since PETN is usually purified by crystallisation from acetone solution, and it is convenient to treat the PETN with the silicone by incorporating it into the PETN solution, it is especially advantageous to use silicones which are soluble in acetone.

Preferred acetone soluble linear polysiloxanes include trimethyl siloxy end-blocked polymethyl hydrogen siloxane and trimethyl siloxy end-blocked polydimethyl siloxane and it is preferred that these polysiloxanes should contain on average 40 to 100 polysiloxane ($-SiR_2O$) units in their molecules.

Preferred cyclic polysiloxanes include, for example, methyl hydrogen cyclotetrasiloxane.

The invention also includes a method of preparing improved PETN wherein PETN particles are coated with silicone. Advantageously the PETN particles are formed by deposition from a solution containing silicone. Thus in one convenient procedure the PETN and silicone are both dissolved in a mutual solvent, for example acetone, and silicone coated PETN particles are deposited by the addition of water to the solution. The silicone coated PETN is readily separated and dried.

The silicone coating treatment has no significant effect on the free running properties of the PETN and the treated material can be readily fed into detonator tubes and through small dies into the core of detonating fuse-cord. We have found that detonating cord having a core of silicone coated PETN is markedly superior to similar cord with untreated PETN in its ability to resist the migration of water along the core, and it is therefore more reliable for use in wet conditions.

Thus the invention also includes detonating fuse-cord having a core of silicone coated PETN.

The invention is further illustrated by the following examples in which all parts and percentages are by weight.

EXAMPLES

In the examples the silicones used were

A— Trimethyl siloxy end-blocked polymethyl hydrogen siloxane having about 50 methyl hydrogen siloxane units and commercially available as silicone oil DP42 from Imperial Chemical Industries Limited.

B — Trimethyl siloxy end-blocked polydimethyl siloxane having about 90 dimethylsiloxane units and commercially available as silicone oil F111/100 from Imperial Chemical Industries Limited.

C — Methyl hydrogen-cyclo-tetrasiloxane commercially available as silicone oil EP 5823 from Imperial Chemical Industries Limited.

D — Polymethyl siloxane prepared by hydrolysis of a mixture containing 70 percent dimethyl dichlorosilane and 30 percent methyltrichlorosilane.

Examples 1 to 13

In the preparation of the coated PETN in these Examples, 650 parts of PETN crystals, wetted with 228 parts water, were dissolved in 1,950 parts of acetone (98 percent pure). Silicone dissolved in its own weight of acetone was added to the PETN solution and the resulting solution stirred for 5 minutes. 1,700 parts of water were then added to the solution, 1,000 parts being added over an hour and 700 parts over the next 17 minutes and all the PETN was thereby precipitated. The PETN was separated and dried in warm air.

The silicone coated crystalline PETN was very free running and detonating cord was readily made from it in the conventional manner by feeding the crystals in a continuous stream through a die whilst a paper tape was formed into a tubular envelope around it. The envelope was covered with a spun helical layer of polypropylene yarn followed by a similar counterspun layer and the polypropylene layers were covered with an extruded polyvinyl chloride sheath.

The detonating cord produced was tested for its ability to be initiated and to propagate detonation when wet.

In the test for propagation after immersion in water (wet propagation) 5 metre long samples were suspended vertically in a tank of water, the PETN core being exposed to the water at the bottom end and the top 2 metres being outside the water level. After immersion for the test period the samples were fired by means of a No. 6 ASA detonator (0.24 g PETN base charge) attached to the dry end.

In a modified wet propagation test the sides of the samples were split open for alternate 12 millimetre lengths before immersion in water.

In the wet initiation test, 2.5 cm lengths at the ends of 3 metre sample lengths of detonating cord, of which the cores were exposed, were immersed in water for the test period and initiated from a No. 6 ASA detonator strapped to the wet end.

The gap propagation was measured as the maximum air gap across which detonation was communicated from a length of detonating cord to another placed parallel to it.

Details of silicone coated PETN and the properties of detonating cord containing core charges of the PETN are given in the following table. Examples 12 and 13 using untreated PETN are included for comparison.

| | | | | Properties of detonating cord | | | | |
|---|---|---|---|---|---|---|---|---|
| | | Amount of silicone (parts/650 parts PETN) | Charge, g./m. | Velocity of detonation, km./s. | Gap propagation, mm. | Wet progation | | Wet initiation |
| Example | Silicone type | | | | | Sides intact | Sides slit | |
| 1 | A | 1.1 | 10 | 6.7 | 11 | Fired at 72 hrs | Fired at 72 hrs | Fired at 72 hrs. |
| 2 | A | 1.1 | 20 | 6.9 | 18 | ....do.... | ....do.... | Do. |
| 3 | A | 0.0 | 10 | 6.7 | 11 | ....do.... | ....do.... | Do. |
| 4 | A | 0.9 | 20 | 6.9 | 20 | ....do.... | ....do.... | Do. |
| 5 | A | 0.66 | 10 | 6.7 | 10 | ....do.... | ....do.... | Do. |
| 6 | A | 0.66 | 20 | 6.9 | 20 | ....do.... | ....do.... | Do. |
| 7 | B | 1.1 | 10 | 6.8 | 12 | ....do.... | ....do.... | Do. |
| 8 | B | 1.1 | 20 | 6.9 | 22 | ....do.... | ....do.... | Do. |
| 9 | C | 1.1 | 10 | 6.8 | 11 | ....do.... | ....do.... | Do. |
| 10 | C | 1.1 | 20 | 6.9 | 18 | ....do.... | ....do.... | Do. |
| 11 | D | 1.0 | 10 | 6.8 | 11 | ....do.... | ....do.... | Do. |
| 12 | Nil | Nil | 10 | 6.8 | 11 | Failed at 5 hrs | Failed at 5 hrs | Failed at 5 hrs. |
| 13 | Nil | Ni. | 20 | 6.9 | 18 | ....do.... | ....do.... | Do. |

The results given in the table show that detonating cord containing a core of silicone coated PETN gives a much better performance after immersion in water than detonating cord containing untreated PETN. When the latter cord was immersed in water the water permeated through the PETN core causing propagation failure, whereas the silicone coating markedly reduced the water permeability of the PETN and reduced the water migration into the core. The silicone coating had no significant effect on the other explosive properties or on the free running properties of the PETN.

Example 14

1.0 part of silicone type A was added to 600 parts of dry PETN and the mixture was tumbled in a revolving drum mixer for one hour. Detonating cord having a core of 10 g/m of the treated PETN was prepared and tested as described for Examples 1 to 13. The velocity of detonation of the cord was 6.7 km/s and the gap propagation was 11 mm. In the wet propagation test the cord fired at 72 hours immersion both with the sides intact and slit, and the wet initiation test it fired at 72 hours.

Example 15

1.5 parts of a silicone emulsion containing 30 percent silicone type A, 30 percent silicone type B and 40 percent water were uniformly mixed into a slurry of 600 parts of PETN in 600 parts of water. The silicone treated PETN was separated, dried and incorporated at a charge loading of 10 g/m into detonating cord. The detonating cord had properties identical to those of the cord prepared in Example 14.

What we claim is:

1. PETN of reduced water permeability comprising PETN particles coated with silicone.
2. PETN as claimed in claim 1 comprising 0.1 to 0.5 percent by weight of silicone.
3. PETN as claimed in claim 1 wherein the silicone is soluble in acetone.
4. PETN as claimed in claim 1 wherein the silicone comprises a polysiloxane containing units having the structure $R_xSiO_{(4-x)/2}$ wherein R represents a member of the group consisting of hydrogen monovalent hydrocarbon groups, not more than one hydrogen atom being attached to any Si atom, and $x$ is an integer not greater than 2.
5. PETN as claimed in Claim 4 wherein the silicone is selected from the group consisting of linear polysiloxanes having the formula $(CH_3)_3Si[OSiR_2]_n OSi(CH_3)_3$ wherein R represents a member of the group consisting of hydrogen and alkyl groups and $n$ is an integer and cyclic polysiloxanes having the formula $(SiR_2O)_n$ wherein R represents a member of the group consisting of hydrogen and alkyl groups and $n$ is an integer of 3 to 8.
6. PETN as claimed in claim 5 wherein the silicone is selected from the group consisting of trimethyl siloxy end-blocked polymethyl hydrogen siloxane containing on average 40 to 100 polysiloxane units, trimethyl siloxy end-blocked polydimethyl siloxane containing on average 40 to 100 polysiloxane units and methyl hydrogen cyclotetrasiloxane.
7. A method of preparing PETN as claimed in Claim 1 wherein PETN particles are coated with silicone.
8. A method as claimed in claim 7 wherein the PETN particles are formed by deposition from a solution containing silicone.
9. A method as claimed in claim 8 wherein PETN and silicone are dissolved in a mutual solvent and silicone coated PETN particles are deposited by the addition of water to the solution.
10. Detonating fuse-cord having a core of PETN as claimed in claim 1.

* * * * *